United States Patent [19]

Gregg et al.

[11] 4,160,735

[45] Jul. 10, 1979

[54] FLUID FILTER BYPASS VALVE ASSEMBLY

[75] Inventors: Edmund Gregg, Willowick; Charles E. Pilarczyk, Bedford Heights, both of Ohio

[73] Assignee: Towmotor Corporation, Mentor, Ohio

[21] Appl. No.: 822,168

[22] Filed: Aug. 5, 1977

[51] Int. Cl.² .................. B01D 27/10; B01D 35/14
[52] U.S. Cl. ........................... 210/130; 210/136; 210/168; 210/172; 210/416 L
[58] Field of Search ................ 137/540, 543.15; 210/130-133, 136, 167, 168, 172, DIG. 14, 416 L

[56] References Cited

U.S. PATENT DOCUMENTS

| | | | |
|---|---|---|---|
| 3,007,693 | 11/1961 | Templeton | 137/543.15 X |
| 3,235,085 | 2/1966 | Humbert, Jr. | 210/136 X |
| 3,334,746 | 8/1967 | Rosaen | 210/131 X |
| 3,388,800 | 6/1968 | MacGregor | 210/131 |
| 3,425,511 | 2/1969 | Severin | 210/130 X |
| 3,572,508 | 3/1971 | Rice | 210/130 |
| 3,883,430 | 5/1975 | Codo | 210/172 X |

Primary Examiner—Robert H. Spitzer
Attorney, Agent, or Firm—Phillips, Moore, Weissenberger, Lempio & Majestic

[57] ABSTRACT

An improvement in fluid filter bypass valve assemblies is disclosed in which bypassed fluid is discharged below the normal level of fluid in the assembly to avoid aeration of the by-passed fluid. The improved assembly includes a bypass valve structure comprising an elongated conduit communicating at one end with the high pressure side of the filter element and having a spring loaded sleeve slidably surrounding its free end. The free end of the conduit is normally sealed by the sleeve in cooperation with a flanged end cap but the sidewall of the free end of the conduit is provided with an aperture opening into a portion of the sleeve having enlarged internal dimensions so that fluid pressure higher than normal communicated through such opening into the sleeve will cause it to slide along the conduit against the spring loading and away from sealing engagement with the end cap to release fluid through the conduit. Preferred structural features of the bypass valve are described.

7 Claims, 3 Drawing Figures

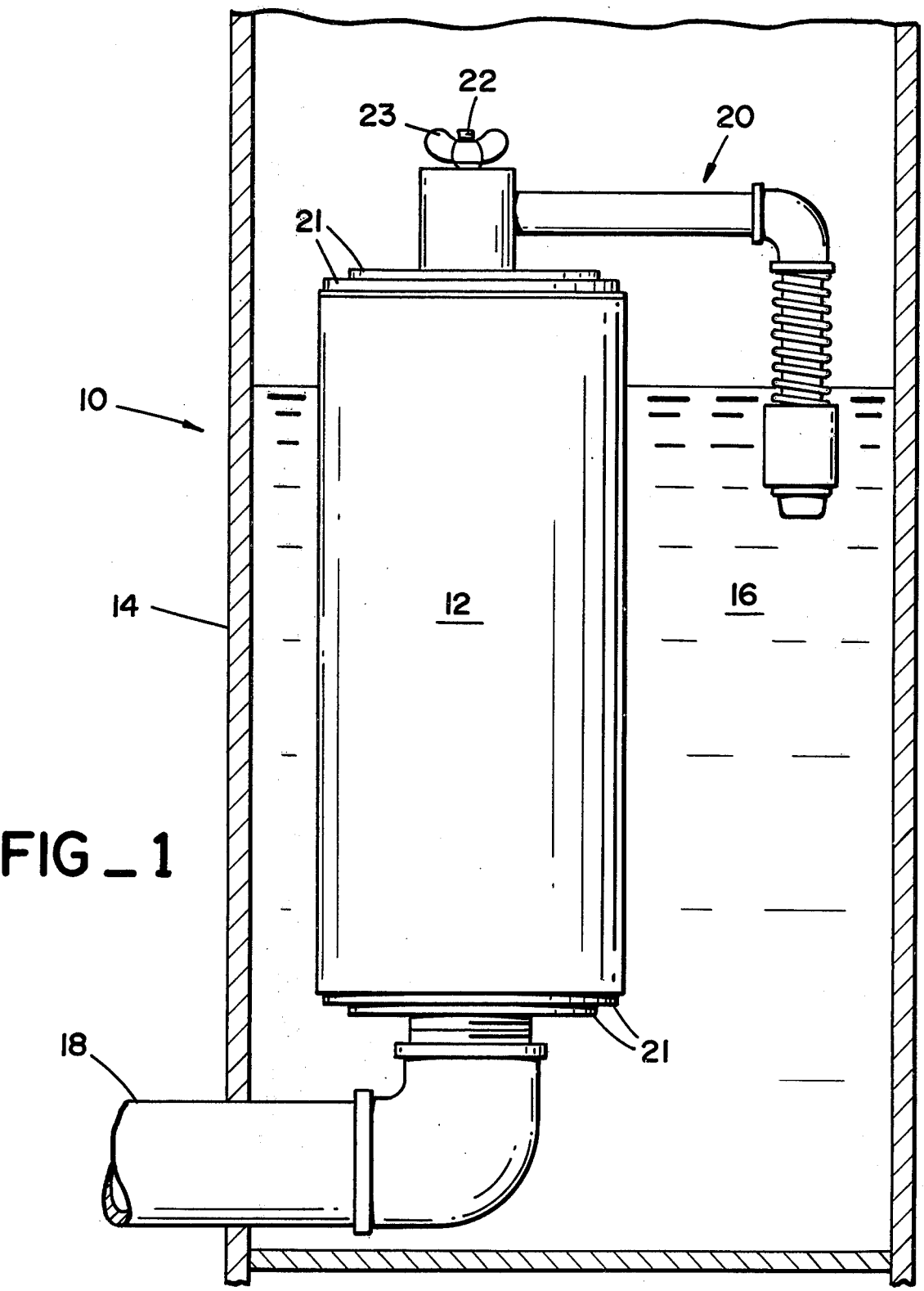
FIG_1

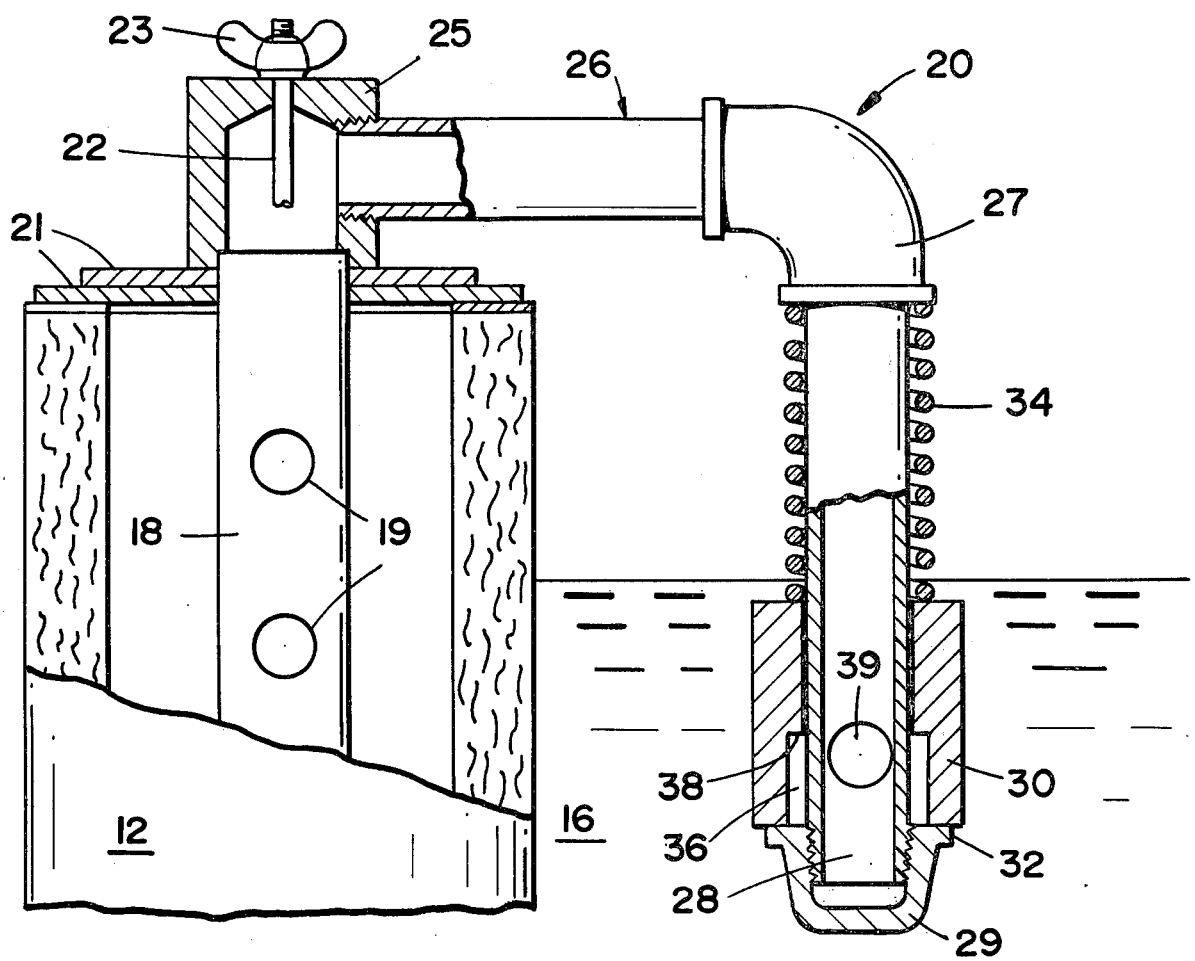
FIG_2
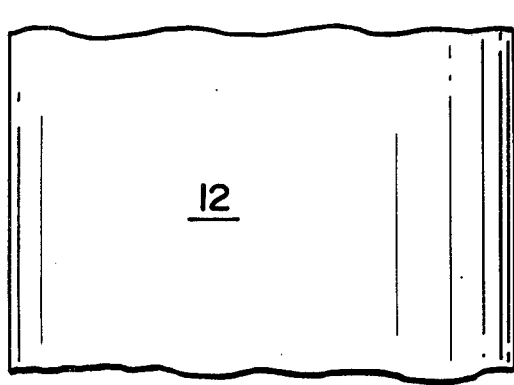
FIG_3
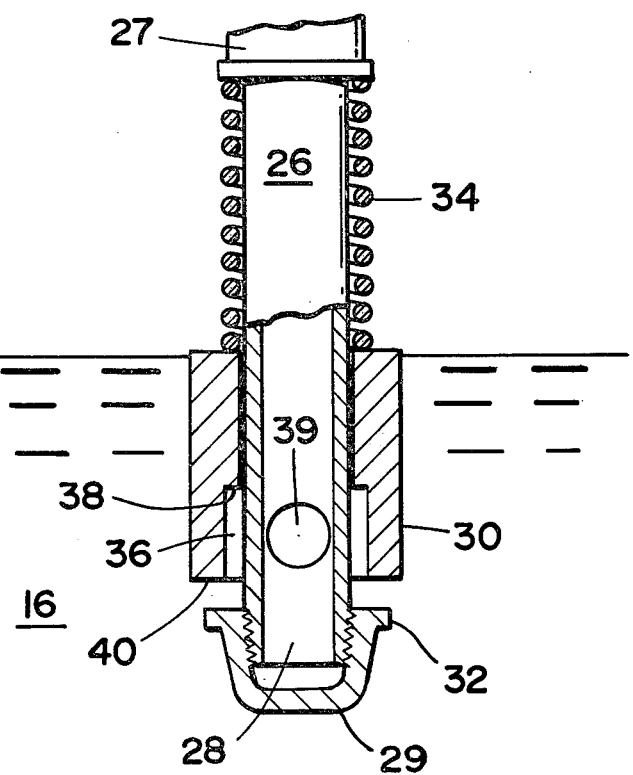

FLUID FILTER BYPASS VALVE ASSEMBLY

BACKGROUND OF THE INVENTION

This invention relates to fluid filter assemblies including a bypass valve and more particularly to a fluid filter assembly having an improved bypass structure.

Hydraulic circuits and oil lubricating systems generally employ filters to remove contaminants from the fluid. Because of the need for continuous supply of fluid and to prevent rupture of the filter element and the consequent contamination of the fluid, these filter assemblies are provided with a bypass valve. The bypass valve is designed to open when the filter becomes so clogged as to cause a predetermined pressure rise thereacross. The opening of the valve permits fluid to bypass the filter element to supply the demands of the system.

In the prior art, various filter assemblies of such type are known. However, there are three basic considerations involved in designing a fluid filter and bypass assembly some, but not all, of which are met in the filter assemblies of the prior art.

The first consideration is to reduce the likelihood that contaminants trapped by the filter will be carried into the reservoir when the bypass valve is actuated. The second consideration is to avoid aeration of the bypassed fluid resulting not only in the formation of foam in the reservoir, but also in the entrainment of air in the fluid which can be more harmful to the active elements of the hydraulic system than solid contaminants. The third consideration is that the bypass valve structure must be simple and inexpensive to manufacture while providing reliability in operation.

It is a basic object of this invention to provide an improved fluid filter assembly including a bypass valve structure which meets all of the above considerations without complicated design or complex construction.

SUMMARY OF THE INVENTION

Broadly stated, this invention is an improvement in a fluid filter assembly comprising a filter element, means for supplying fluid under pressure to one side of the filter element, reservoir means for receiving filtered fluid from the other side of the filter element and a normally closed bypass valve means adapted to open and provide communication of pressurized fluid at one side of the filter to the reservoir at the other side of the filter when the pressure of such pressurized fluid exceeds a given amount. The improvement comprises a bypass valve means including an elongated conduit having one end in communication with the pressurized fluid at one side of the filter element and extending to a free end located below the minimum normal level of fluid in the reservoir at the other side of the filter element. The free end of the conduit is closed by plug means. An outwardly extending flange is provided about the free end of the conduit. A fluid impervious sleeve surrounds the free end of the conduit in slidable engagement therewith and with one end adapted to seat against the outwardly extending flange at the free end of the conduit. A spring means urges the sleeve into engagement with the outwardly extending flange at the free end of the conduit. The sleeve has a portion at the end thereof in engagement with the outwardly extending flange which is of enlarged internal dimensions and provides a surface extending transversely of the axis of the sleeve intermediate its ends. An opening is provided through the sidewall of the free end of the conduit which opening communicates with the end portion of the sleeve having enlarged internal dimensions.

BRIEF DESCRIPTION OF THE DRAWINGS

The foregoing and other objects and features of this invention will be more fully understood from a reading of the following detailed description of a preferred embodiment thereof in conjunction with the attached drawing wherein:

FIG. 1 is a view showing a fluid filter assembly in accordance with this invention partially in side elevation and partially in cross-section.

FIG. 2 is an enlarged fragmentary view showing the bypass valve structure of FIG. 1 partially in cross-section and in its normally closed position.

FIG. 3 is a fragmentary view similar to FIG. 2 but with certain parts omitted and showing the bypass valve stucture in its open position.

DETAILED DESCRIPTION OF A PREFERRED EMBODIMENT

Referring to FIG. 1, a fluid fiber assembly 10 according to one embodiment of the teaching of this invention is shown. According to this embodiment, the fluid filter assembly 10 is of the "inside-out" type and thus the filter element 12 is a tubular filter body shown in side elevation contained within a housing 14 shown in cross-section. The housing 14 also serves as the reservoir for the hydraulic system and a quantity of hydraulic fluid 16 is indicated within the housing 14 at a level approaching the minimum normal level for the system.

In operation, hydraulic fluid 16 is drawn from the housing 14 through an outlet (not shown) by a pump (not shown) which supplies pressurized hydraulic fluid to the active elements (not shown) of the hydraulic system. Pressurized fluid is returned to the housing 14 by means of the conduit 18 sealed through a wall thereof and communicating with the interior of the tubular filter element 12. As shown in FIG. 1 the opposite ends of the tubular filter element 12 are closed and according to this invention a bypass valve structure 20 is provided at the upper end of the tubular filter element 12. When the hydraulic fluid 16 in the housing 14 is at its normal maximum level, the filter element 12 together with the bypass valve structure 20 will be completely submerged in such hydraulic fluid 16.

Referring to FIG. 2, it will be seen that the inlet conduit 18 extends axially through the filter element 12 and is provided with a plurality of openings 19 along its length which communicate with the interior of the filter element 12. The bypass valve structure 20 is in communication with the open end of the conduit 18. Thus in normal operation, hydraulic fluid returned from the active elements of the hydraulic system under pressure through the conduit 18 will be discharged through the openings 19 into the interior of the filter element 12 and will pass through the filter element 12 into the reservoir provided by the housing 14. The larger and heavier contaminants will tend to accumulate toward the bottom of the filter element 12 and as the filter element 12 becomes progressively clogged with contaminants, the passage of fluid through the filter element and the discharge of fluid through the openings 19 of the conduit 18 will decrease. As a result, the pressure within the filter element 12 and the conduit 18 will tend to increase.

As best shown in FIG. 2, the filter element 12 is removably mounted within the housing 14 by means of sealing plates 21 engaging opposite ends of the filter element 12 and being apertured to receive the conduit 18 therethrough in fluid tight relation. The fluid filter element 12 may be compressively held between the sealing plates 21 as by means of a bolt 22 and wing nut 23 arrangement which will also facilitate the removal and replacement of the filter element 12 as required.

The bypass valve structure 20 includes a housing 25 which is held in compressive engagement with the sealing members 21 as well as with the open end of the inlet conduit 18. The bypass valve structure 20 also comprises an elongated conduit 26 which may include an elbow 27 or an appropriate bend so that the free end 28 of the conduit 26 may be located below the minimum normal level of the hydraulic fluid 16 in the reservoir provided by the housing 14.

The free end 28 of the conduit 26 is closed to the passage of fluid by an appropriate plug 29 and a sleeve 30 is received about the free end portion of the conduit 26 with a close sliding fit. The end of the sleeve 30 adjacent the free end 28 of the conduit 26 is urged into compressive abutment with a flange 32 at the free end 28 of the conduit 26 by means of a helical compression spring 34. As shown in the drawing, the plug 29 is threadedly received on the exterior of the free end 28 of the conduit 26 and provides the flange 32 about the exterior of the free end 28 of the conduit 26. However, the plug member 29 could be received within the free end 28 of the conduit 26 and the flange 32 could be provided by other means about the exterior of the free end 28 of the conduit 26. Similarly, other spring means could be used to urge the sleeve 30 into compressive abutment with the flange 32.

The sleeve 30 provides the active element of the bypass valve structure 20. Thus, a portion of the length of the sleeve member 30 at the end thereof adjacent the free end 28 of the conduit 26 has enlarged internal dimensions providing an open ended chamber 36 bounded on one side by the external surface of the wall of a portion of the conduit 26 at the free end 28 thereof. The chamber 36 is formed so that a portion 38 of its internal area extends transversely of the axis of the sleeve 30 and an opening 39 is provided through the wall of the free end portion of the conduit 26 in communication with the chamber 36.

In operation, pressurized hydraulic fluid in conduit 18 not only passes through the openings 19 into the interior of the fluid filter element 12 but is also introduced into the housing 25 and conduit 26 of the bypass filter structure 20. In normal operation, the hydraulic fluid will pass readily through the filter element 12 and the flow of hydraulic fluid through the openings 19 in the conduit 18 to the interior of the fluid filter element 12 will reduce the pressure of the fluid in the housing 25 and conduit 26 of the bypass valve structure 20 to a low value. At such low value of hydraulic pressure in the bypass valve structure 20, the spring 34 will maintain the sleeve 30 in compressive engagement with the flange 32.

As the fluid filter element 12 becomes clogged with contaminants, the flow of fluid therethrough from the openings 19 in the conduit 18 will decrease and the pressure within the housing 25 and conduit 26 of the bypass valve structure 20 will increase.

Referring to FIG. 3, pressurized fluid in the conduit 26 will be communicated through the opening 39 into the chamber 36. Pressurized fluid acting on the transverse area 38 of the internal surface of the chamber 36 will tend to counteract the force of the spring 34 causing the sleeve 30 to slide along the conduit 26 away from the flange 32 as shown. Pressurized fluid from the conduit 26 may then flow between the flange 32 and the end 40 of the sleeve 30 into the hydraulic fluid 16 within the reservoir.

The transverse area 38 and the force of the spring 34 may be selected in relation to each other so that fluid at a given pressure within the conduit 26 will produce movement of the sleeve 30 from the position shown in FIG. 2 toward the position shown in FIG. 3. As soon as a slight amount of movement has occurred, pressurized fluid will be admitted between the flange 32 and the transverse area at the end 40 of the sleeve 30 and such pressurized fluid will act on the end 40 of the sleeve 30 tending to produce additional forces counteracting the force of the compression spring 34. Thus, once the sleeve 30 has moved a slight amount (sometimes referred to as "cracking" of the valve) there will be a tendency for the valve to assume its fully open position as shown in FIG. 3. This action may be enhanced by providing a plurality of openings 39 through the wall of the conduit 26 and communicating with the chamber 36 to insure an adequate flow of fluid to maintain the pressure at the gap between the end of the sleeve 30 and the flange 32.

Since the fluid flowing into the housing 25 and conduit 26 of the bypass valve structure is received directly from the inlet conduit 18, there is a reduced possibility that contaminants present within the fluid filter 12 will be carried through the bypass valve structure and enter the hydraulic fluid 16 in the reservoir. Also, since the fluid flowing through the bypass valve structure is introduced into the fluid 16 within the reservoir beneath the minimum normal level thereof, there will be no entrainment of air in such fluid flow and thus no frothing or bubbles will be produced within the reservoir due to the action of the bypass valve. As pointed out hereinabove, the presence of minute air bubbles entrained in the hydraulic fluid can be more harmful to the active elements of the hydraulic system than contaminants of equally small size. In addition, the formation of a froth or foam on top of the hydraulic fluid in the reservoir which may cause undesirable effects such as the masking of an abnormally low level or the creation of undesired pressure differentials within the reservoir will be avoided.

The compression spring means acting between the elbow 27 and the sleeve 30 is a particularly simple arrangement which is highly desirable in the bypass valve structure of this invention. However, other spring means for urging the sleeve 30 into contact with the flange 32 could be used.

A close fit between the sleeve 30 and the exterior of the conduit 26 is desirable in order to minimize the passage of hydraulic fluid therebetween. However, an absolutely fluid-tight fit is not required. Similarly, a fluid-tight seating engagement between the end 40 of the sleeve 30 and the flange 32 is not required. It is only necessary to minimize the flow of fluid through the bypass valve structure when the fluid in the conduit 26 is at a low pressure.

As shown in the drawing, the chamber 36 is conveniently a cylindrical annulus providing a circular shoulder 38 extending transversely to the axis of the sleeve 30. However, other open ended shapes providing an area extending transversely of the axis of the sleeve and providing for the flow of fluid therethrough upon movement of the sleeve away from the flange 32 could be used. It may also be advantageous to locate the openings 39 through the sidewall of the conduit 26 with respect to the chamber 36 so that the openings 39 are partially covered when the sleeve 30 is in its normally closed position as shown in FIG. 2 and the openings are in full communication with the chamber 36 when the sleeve 30 is in its fully open position as shown in FIG. 3 in order to compensate for the flow of fluid through the gap between the end 40 of the sleeve 30 and the flange 32 and thereby maintain the forces tending to hold the valve open. Thus, it is believed that those skilled in the art will make various modifications in the specific embodiment of this invention as shown in the drawing some of which are suggested above without departing from the teaching of this invention. In particular, the teaching of this invention may be embodied in filter assemblies of the "outside-in" type, as well as the "inside-out" type filter assembly of the embodiment shown and described in detail herein.

We claim:

1. In a fluid filter assembly comprising a filter element, means for supplying fluid under pressure to one side of said filter element, reservoir means for receiving filtered fluid from the other side of said filter element and a normally closed bypass valve means adapted to open and provide communication between said one side and said other side of said filter element when the fluid pressure at said one side of said filter element exceeds the fluid pressure at the other side of said filter element by a given amount; the improvement wherein said bypass valve means comprises:

(a) an elongated conduit having one end in communication with said one side of said filter element and extending to a free end located below the minimum normal level of fluid in said reservoir means, said conduit having an opening through the sidewall thereof spaced from said free end thereof;

(b) plug means closing said free end of said conduit;

(c) outwardly extending flange means about said free end of said conduit;

(d) a fluid impervious sleeve closely surrounding a portion of said free end of said conduit in slidable engagement with the external surface thereof and with one end of said sleeve adapted to seat against said outwardly extending flange means at said free end of said conduit, said sleeve having a portion of enlarged internal dimension at said one end thereof providing an internal surface extending transversely of the axis of said sleeve intermediate the ends thereof with said end portion of enlarged internal dimension of said sleeve together with the external surface of said free end portion of said conduit defining a chamber in communication with said opening through said sidewall of said conduit, said chamber being open at one end of said sleeve and closed at the other end of said sleeve; and, (e) means for resiliently urging said one end of said sleeve into compressive seating engagement with said outwardly extending flange means, the area of compressive seating engagement between said one end of said sleeve and said flange means being equal to at least a substantial portion of the cross-sectional area of said chamber.

2. The improvement in a fluid filter assembly as claimed in claim 1 wherein said external surface of said free end portion of said conduit is a circular cylinder and said chamber defines a circular annulus thereabout.

3. The improvement in a fluid filter assembly as claimed in claim 2 wherein said opening through the sidewall of said free end of said conduit in communication with said end portion of enlarged internal dimension of said sleeve is partially closed by said sleeve when said one end of said sleeve is in compressive seating engagement with said outwardly extending flange means at said free end of said conduit.

4. The improvement in a fluid filter assembly as claimed in claim 2 wherein said means for resiliently urging said one end of said sleeve into engagement with said flange means is a helical compression spring surrounding said conduit at the free end portion thereof, one end of said spring being in engagement with the other end of said sleeve and the other end of said spring being restrained against axial movement along said conduit away from said sleeve.

5. The improvement in a fluid filter assembly as claimed in claim 2 wherein the free end of said conduit is provided with external threads, said plug means comprises a cap threadedly engaging said external threads and said cap provides said outwardly extending flange means about said free end of said conduit.

6. The improvement in a fluid filter assembly as claimed in claim 1 wherein said filter element is tubular with the axis thereof extending vertically and the ends thereof sealed against communication of fluid between the inside and the outside thereof other than through said means for supplying fluid under pressure to one side thereof; said elongated conduit of said bypass valve means communicating with said one side of said tubular filter element at the top thereof.

7. The improvement in a fluid filter assembly as claimed in claim 6 wherein the inside of said tubular filter element comprises said one side of said filter element and said means for supplying fluid under pressure to said one side of said filter element comprises an elongated inlet conduit extending axially through said tubular filter element from the bottom thereof and terminating in an open end at the top thereof, said elongated inlet conduit having a plurality of openings through the side wall thereof within said tubular filter element and said elongated conduit of said bypass valve means communicating with said open end of said elongated inlet conduit at the top of said tubular filter element.

* * * * *